United States Patent [19]

Severijns et al.

[11] Patent Number: 4,774,104
[45] Date of Patent: Sep. 27, 1988

[54] IRRADIATION DEVICE, ARRANGEMENT FOR AND METHOD OF CLADDING A FILAMENTARY BODY

[75] Inventors: Adrianus Severijns; Cornelis Jochem, both of Eindhoven, Netherlands

[73] Assignee: U.S. Philips Corporation, New York, N.Y.

[21] Appl. No.: 50,174

[22] Filed: May 13, 1987

[30] Foreign Application Priority Data

May 13, 1986 [NL] Netherlands ............... 8601197

[51] Int. Cl.⁴ ............................................. B05D 3/06
[52] U.S. Cl. ................................... 427/54.1; 118/620; 250/504 R; 427/163
[58] Field of Search ................... 427/54.1, 163; 250/504 R, 504 H; 152/174; 118/620

[56] References Cited

U.S. PATENT DOCUMENTS 4,201,618  5/1980  Lewis ........................... 156/502

Primary Examiner—John H. Newsome
Attorney, Agent, or Firm—Thomas A. Briody; Jack E. Haken

[57] ABSTRACT

The invention relates to an irradiation device which is employed in particular in an arrangement for cladding a filamentary body 5, and to a method of cladding such a filamentary body 5, which irradiation device comprises a light source 1 and at least one optical conductor 4 which is provided with a light-entrance window at a first end and a light-exit window at a second end, the light-entrance window being directed to the light source.

A cylinder lens 6 is positioned between each light-exit window and the location of the object to be irradiated during operation of the device.

Preferably, the first end of the optical conductor 4 is sealed into the wall of a lamp envelope and the cylinder lenses are provided in the wall of a mainly cylindrical body 7 through which a filamentary body 5 which is to be clad can be led.

9 Claims, 2 Drawing Sheets

IRRADIATION DEVICE, ARRANGEMENT FOR AND METHOD OF CLADDING A FILAMENTARY BODY

FIELD OF THE INVENTION

The invention relates to an irradiation device comprising a light source and at least one optical conductor which is provided with a light-entrance window at a first end and a light-exit window at a second end, the light-entrance & window being directed to the light source.

The invention further relates to an arrangement for cladding a filamentary body, which arrangement comprises a fibre-cladding device for providing a UV-curable synthetic resin composition on a filamentary body, and an irradiation device The invention also relates to a method of cladding a filamentary body, in which the filamentary body is coated with a layer of a UV-curable synthetic resin composition which is then made to cure by exposing it to UV-light.

BACKGROUND OF THE INVENTION

U.S. Pat. No. 4,321,073 describes a device for providing a metal coating on a glass fibre, using infrared light which is transmitted, for example, from a laser to the glass fibre by means of optical conductors. The exit windows of the optical conductors are smoothly polished and a diverging beam of infrared light is employed.

It is an object of the invention to provide an irradiation device in which during its operation the light generated by the light source is transmitted very effectively and with a high intensity to the location of the object to be irradiated, in particular when this object is a filamentary body.

SUMMARY OF THE INVENTION

This object is achieved according to the invention by an irradiation device as described in the opening paragraph, which is further characterized in that a cylinder lens is positioned between each light-exit window and the location of the object to be irradiated during operation of the device.

In a preferred embodiment of the irradiation device according to the invention, the device comprises a substantially cylindrical body in the wall of which is (are) provided the cylinder lens(es) and through which the object to be irradiated can be led. The cylindrical body may be made of, for example, quartz glass.

In order to collect the light generated by the light source in an effective way, the light source comprises a translucent lamp envelope which is sealed in a vacuum-tight manner, and the irradiation device according to the invention is further characterized in that the optical conductor is sealed with its first end into the wall of the lamp envelope. A lamp having an optical conductor which is sealed into the wall of the lamp envelope is described rn Netherlands Patent Application NL No. 8502862.

The irradiation device according to the invention may be used, for example, to irradiate a liquid thread which is used to produce a synthetic resin fibre as described in Netherlands Patent Application NL No. 8600307.

A further object of the invention is to provide an arrangement for cladding a filamentary body by means of a UVcurable synthetic resin composition. The filamentary body may be, for example, a glass fibre or a metal wire, for example a copper wire. An arrangement for cladding a glass fibre is described in, for example, U.S. Pat. No. 4,324,575.

In such arrangements it is important to obtain a high light output on the filamentary body, so that the number of light sources can be limited and the curing rate of the synthetic resin composition increased. It is known that mirrors are used for this purpose; reference is made to, for example, European Patent Application EP No. 0168105.

It is an object of the invention to increase the effectiveness with which the light is transmitted to its destination, yet without transferring a large amount of heat from the light source to the filamentary body to be clad.

This object is achieved according to the invention by an arrangement for cladding a filamentary body, as described in the opening paragraph, which arrangement is further characterized in that the irradiation device comprises a light source and at least one optical conductor & which is provided with a light-entrance window at a first end and a light-exit window at a second end, the light entrance window being directed to the light source.

The invention is very effective because the exit windows of the optical conductors can be positioned very close to the object to be irradiated without the risk of too large a heat transfer. An additional advantage of the device according to the invention is that it provides a simplification of the alignment of the optical system relative to a mirror system.

A particular advantage is that the exit windows of the light conductors can be positioned close to the output aperture of the fibre-cladding device, such that there is not sufficient time for the curable synthetic resin composition to form drops on the thread-like body due to, for example, surface tension or differences in viscosity in the still liquid, curable synthetic resin composition.

The arrangement according to the invention may be provided with more than one fibre-cladding device or more than one irradiation device. The irradiation device may comprise several light sources, each of which may be provided with the desired number of light conductors.

In a preferred embodiment of the arrangement for cladding a filamentary body according to the invention, a cylinder lens is positioned between each light-exit window and the location of the filamentary body during operation of the arrangement.

In a very suitable embodiment of the arrangement for cladding a filamentary body the irradiation device comprises a mainly cylindrical body in the wall of which is (are) provided the cylinder lens(es), and through which the thread-like body can be led. An additional advantage of an arrangement according to this latter embodiment is the possibility to carry out the curing operation in a protective atmosphere, for example, to prevent inhibition of the curing reaction by oxygen.

A further object of the invention is to provide a method of cladding a filamentary body, using a UV-curable synthetic resin composition, in which the curable synthetic resin composition is subjected to a high curing rate, and in which the curing step can be initiated as soon as possible after the cladding step.

This object is achieved according to the invention by a method as described in the opening paragraph, which is further characterized in that ultraviolet light is transferred by means of at least one optical conductor from a light source to the filamentary body.

In a preferred embodiment of the method according to the invention, the ultraviolet light is focussed by means of a cylinder lens which is positioned between the optical conductor and the filamentary body.

BRIEF DESCRIPTION OF THE DRAWINGS

The invention will now be explained in more detail by means of an exemplary embodiment and with reference to a drawing, in which FIG. 2 is a cross-sectional view of a detail of the device according to FIG. 1, FIG. 3 is a cross-sectional view of an alternative embodiment of the detail shown in FIG. 2, and in which

DETAILED DESCRIPTION OF THE INVENTION

EXAMPLE 1

Figure 1:
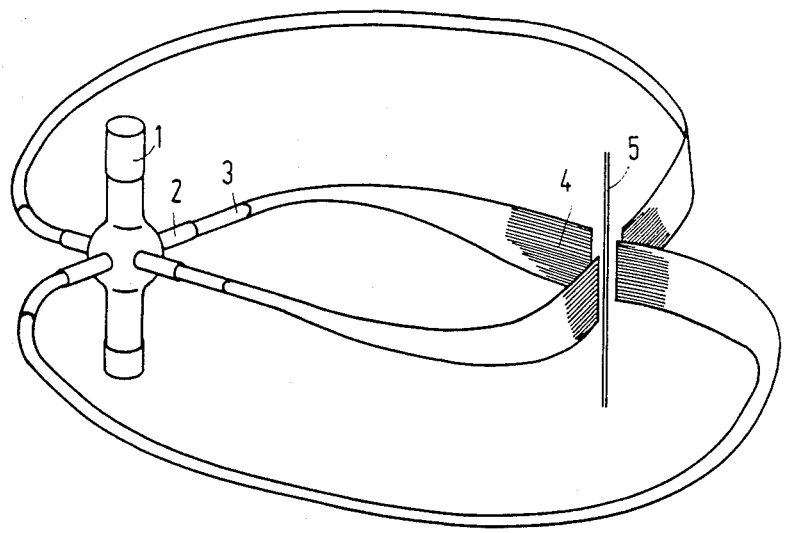
FIG. 1 is a schematic view of an irradiation device according to the invention.

FIG. 1 depicts an irradiation device according to the invention, including a light source 1, for example a 100 W high-pressure mercury vapour discharge lamp having a UV-power of approximately 5 W, light conductors 2 being sealed into the wall of the lamp envelope.

A bundle of light conductors 4 comprising glass fibres having a core and a cladding is etched at one end to the core and sealed into a tube 3 of a glass composition having the same optical properties as the cladding glass of the light conductors. The tube 3 is brought into optical contact with a light conductor 2. At the other end, the bundle of light conductors 4 is formed into a strip so that a filamentary body 5 can be optimally irradiated.

Figures 2, 3:
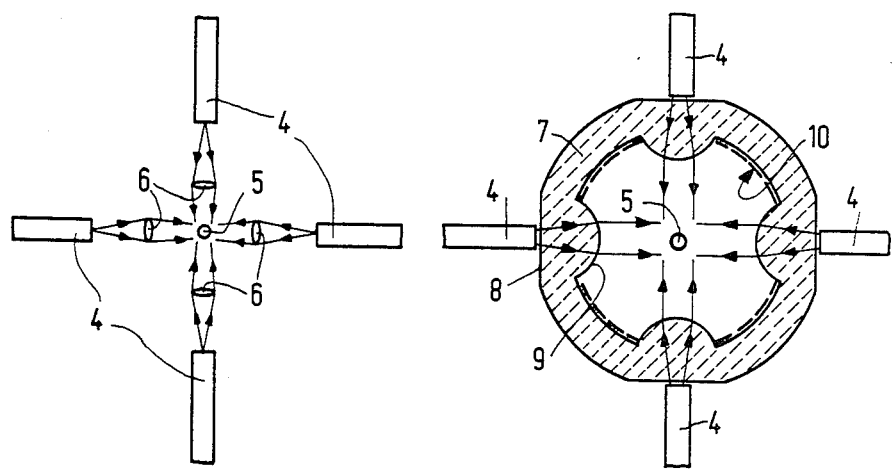

FIG. 2 is a more detailed sectional view of the area around the filamentary body 5 taken in a direction perpendicular to the filamentary body. Due to the large numerical aperture of the light conductors 4 the light emanates from the light conductors in a very diverging manner. By means of cylinder lenses 6 the light is focussed onto the filamentary body 5.

EXAMPLE 2

According to this example the irradiation device shown in FIG. 1 is provided with a cylindrical body 7 as shown in FIG. 3 in which, in a sectional view at right angles to the filamentary body 5, the area around the filamentary body is shown in detail.

The cylindrical body 7 is provided with flat outside surfaces 8 opposite which the flat ends of the light conductors can be positioned. The cylindrical body 7 is provided on its inside with cylinder lenses 9 which focus the light emanating from the light conductors 4 onto the filamentary body 5. To increase the light output it is efficacious to provide the inside of the cylindrical body 7 with a reflecting layer 10 in those places where no light enters during operation of the device.

When a light source is used as described in example 1, and which has four light-conductor bundles, it is possible in the present device to obtain an energy density of more than 5 W/cm².

EXAMPLE 3

Figure 4:
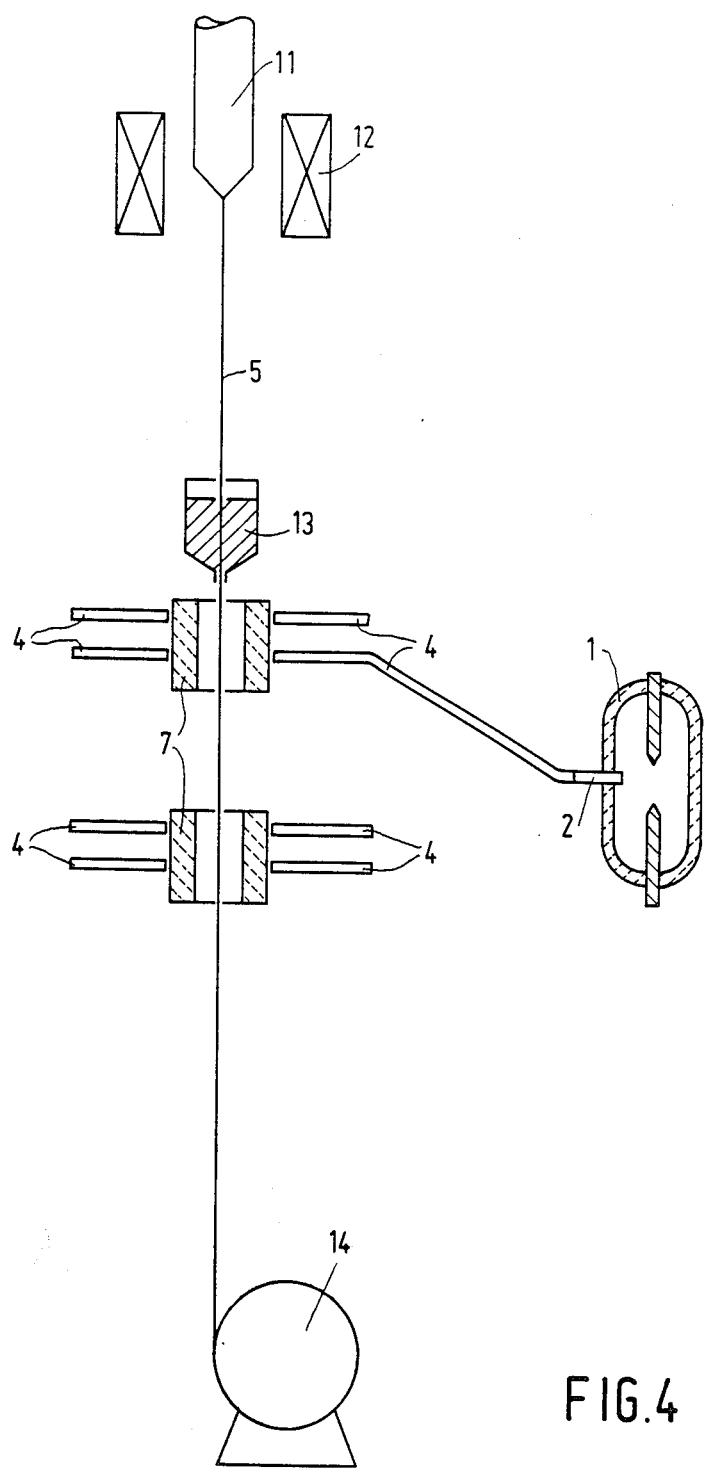
FIG. 4 is a schematic longitudinal sectional view of an arrangement according to the invention for cladding a filamentary body.

FIG. 4 shows an arrangement for cladding glass fibre 5 which is produced in a known manner, for example, by drawing the glass fibre 5 from a preform 11 in a heating device 12.

Immediately after the glass fibre 5 has been drawn, it is provided with a layer of a UV-curable synthetic resin composition by means of a fibre cladding device 13. Such fibre cladding devices and the curable synthetic resin compositions used are described in, for example, U.S. Pat. No. 4,324,575.

Subsequently, the glass fibre 5 is led through at least one cylindrical body 7, the walls of which are provided with cylinder lenses through which light emitted by the light conductors 4 is focussed on the glass fibre 5. For one of the light conductors 4 it is shown how these and other light conductors are connected to one or more light sources 1 via light conductors 2 which are sealed into the lamp envelope.

Finally, the glass fibre 5 is wound onto a reel 14.

When the arrangement according to the invention is used a reduction of equipment and energy is obtained, and the curing rate of a curable synthetic resin composition can be increased. Consequently, not only a higher drawing rate of the fibre is obtained but also a better uniformity and concentricity of the synthetic resin cladding around the glass fibre.

What is claimed is:

1. An irradiation device comprising a light source and at least one optical conductor having a light-entrance window at a first end and a light-exit window at a second end, the light-entrance window being directed to the light source, and a cylinder lens positioned between the light-exit window and the location of the object to be irradiated during operation of the device.

2. An irradiation device as claimed in claim 1, comprising a mainly cylindrical body having a wall through which the object to be irradiateds can be led and the cylinder lens in the wall.

3. An irradiation device as claimed in claim 1 or 2, in which the light source is provided with a translucent lamp envelope which is sealed in a vacuum-tight manner, characterized in that the optical conductor is sealed with its first end into the wall of the lamp envelope.

4. Apparatus for cladding a filamentary body, comprising:
   means for coating the filamentary body with a UV-curable synthetic resin composition, a light source and at least one optical conductor having a light-entrance window at a first end and a light-exit window at a second end, the light-entrance window being directed to the light source, and said light-exit window being disposed adjacent an output of said means for coating said filamentary body, and a cylinder lens positioned between said light-exit window and the location of said filamentary body.

5. An arrangement as claimed in claim 4, comprising an irradiation device having a mainly cylindrical body and wherein the cylinder lenses are in the wall of the cylindrical body and through which body the filamentary body can be led.

6. A method of cladding a filamentary body comprising coating the filamentary body with a layer of UV-curable synthetic resin composition exposing said composition to UV-light transferred by at least one optical conductor from a light source to the filamentary body.

7. A method as claimed in claim 6, comprising focusing the UV-light by means of a cylinder lines which is positioned between the optical conductor and the filamentary body.

8. An irradiation device comprising:

a translucent lamp envelope which is sealed in a vacuum tight manner;

at least one optical conductor having a light entrance window at a first end sealed in said lamp envelope and a light-exit window at a second end; and a cylinder lens positioned between each light-exit window and the location of an object to be irradiated.

9. An irradiation device according to claim 8 further comprising a cylindrical body through which the object to be irradiated can be led and in which said cylinder lenses are in the wall of said cylindrical body.

* * * * *